UNITED STATES PATENT OFFICE.

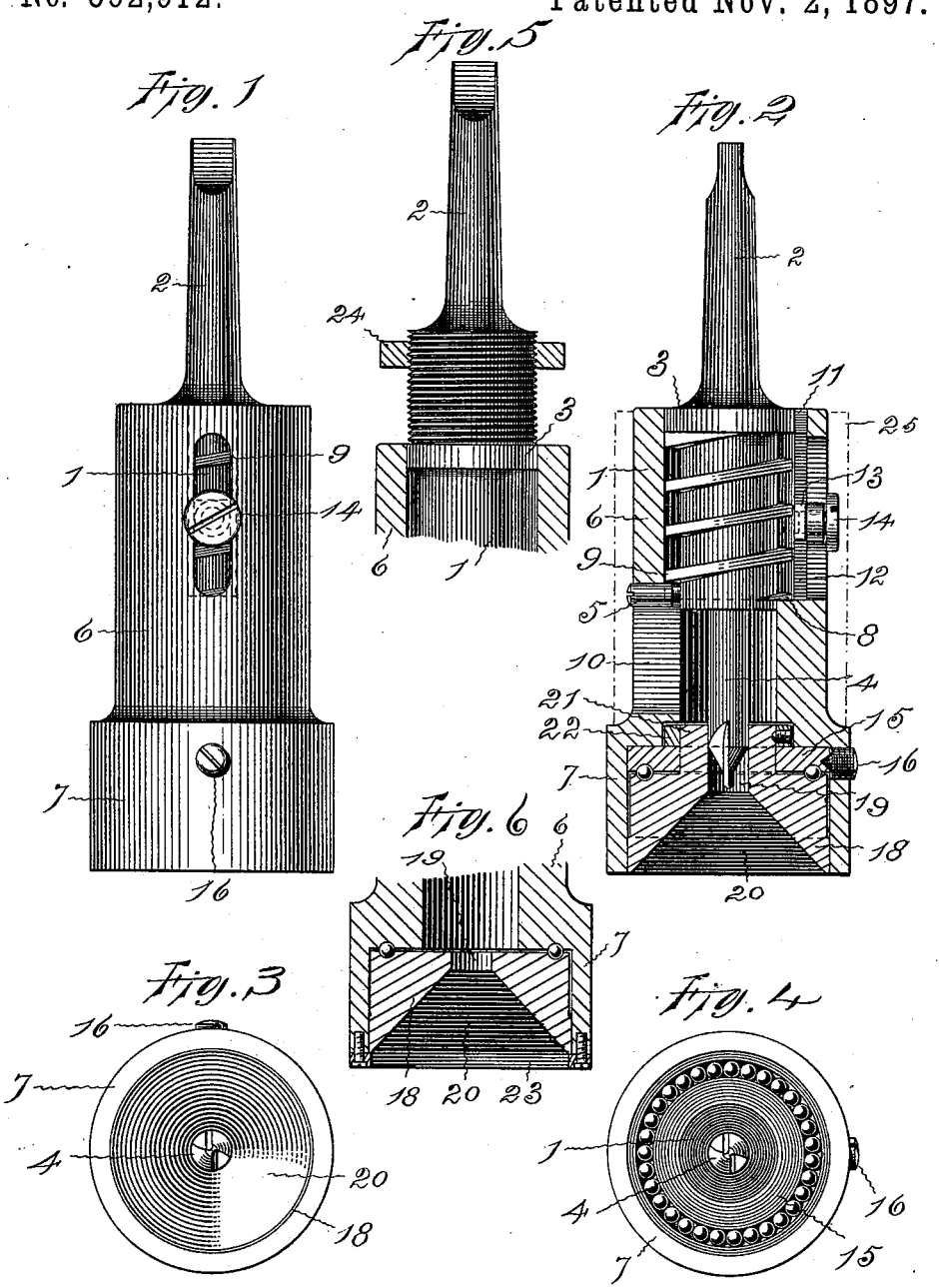

MORGAN JOHNSON, OF HARTFORD, CONNECTICUT.

CENTERING DRILL-CHUCK.

SPECIFICATION forming part of Letters Patent No. 592,912, dated November 2, 1897.

Application filed March 5, 1897. Serial No. 625,938. (No model.)

*To all whom it may concern:*

Be it known that I, MORGAN JOHNSON, a citizen of the United States, residing at Hartford, in the county of Hartford and State of Connecticut, have invented certain new and useful Improvements in Centering Drill-Chucks, of which the following is a specification.

The invention relates to those drill-holding chucks provided for use in connection with drill-presses and lathes which have a part located in advance of the cutting end of the drill that automatically centers the stock to be operated upon just before the drill commences to cut, whether the drill is fed to the stock or the stock fed to the drill, so that the desired perforation will be accurately drilled in the correct location.

The object of the invention is the production of a simple, inexpensive, and convenient chuck usable with any ordinary drill-press or lathe, which is so constructed that the stock will be quickly, automatically, and accurately centered just before being drilled without increasing the load on the machine and without bruising or marring the edges of the stock or unduly wearing or scratching the centering part.

Referring to the accompanying drawings, Figure 1 is a side view of a chuck which embodies the invention. Fig. 2 is a view of the same with parts cut in central longitudinal section. Fig. 3 is a view looking toward the centering and drilling end of the chuck. Fig. 4 is a view of the same end with the centering-block removed. Fig. 5 is a detail view of the shank end of the chuck, showing a modified arrangement of means for regulating the depth of the perforation to be bored; and Fig. 6 is a sectional view of the centering and drilling end of the chuck with a modified arrangement for holding the centering-block in position.

The drill-holder of the chuck shown in the views as embodying the invention has a body 1 and a shank 2, with a collar 3 between the body and shank. The end of the body is recessed to receive the tail of the drill 4, which is held in position by a set-screw 5, and the shank is shaped so that it can be attached to the spindle of any drill-press or lathe.

Outside of the drill-holder is a shell that has a tubular part 6 and a cylindrical part 7 of larger diameter. A portion of the interior diameter of the tubular part is finished to a size that will fit the body of the drill-holder and the remainder is finished to a size that will fit the collar 3, and thrusting between the collar 3 and the shoulder 8 that results from the different diameters of the interior of the tubular part of the shell is a spiral spring 9. A slot 10 is made through the tubular part of the shell in order that the screw 5 may be reached for securing or freeing the drill. This slot may be so located and arranged that the screw will make contact with one end to prevent the spring from thrusting the drill-holder completely out of the shell.

Projecting from the collar 3 or a part of the body of the drill-holder is a stud 11, and movably located in a groove 12, formed in the wall of the tubular part 6, is a slide 13. This slide bears a screw 14, that can be turned from the outside of the shell. When the screw is loosened, the slide can be located in any desired position along the groove, and when the screw is tightened the slide will be secured in that position. The engagement of the stud with the slide determines the amount of relative movement of the shell and the drill-holder against the thrust of the spring.

An annular disk, washer, or ball-plate 15, with an annular groove formed in one face, is located in the bottom of the cylindrical part 7 of the shell. This ball-plate may be held in place by a screw 16. Antifriction-balls 17 are located in the groove of this ball-plate, and a block 18 with a central perforation 19 and a tapering recess 20 in its front end is placed in the cylindrical part 7 of the shell in front of the balls. This block has an annular groove for the balls corresponding with that in the ball-plate.

The block 18 may have a hub 21 projecting from its inner end through the ball-plate 15, and on this hub can be placed a collar 22. When this collar is set on the hub and the ball-plate is secured in position, the block cannot be removed from the cylindrical part of the shell, but it is free to rotate therein on the antifriction-balls.

If desired, as shown in Fig. 6, a ring 23 may be fastened, by screws or otherwise, to the end of the cylindrical part of the shell for preventing the removal of the block 18, and if this latter construction is employed the hub projecting from the block with the collar back of the ball-plate may be dispensed with.

In Fig. 5 the collar 3 is shown as extended and threaded, and on this threaded portion is fitted a threaded collar 24. This collar can be adjusted to any desired position and then fastened, so that it will make contact with the end of the shell at the correct time to limit the relative movement of the shell and drill-holder when the chuck is being used.

If desired, of course, the ball-groove in the shell part can be made directly in the walls of the shell, as shown in Fig. 6, in which case the ball-plate will be unnecessary, but it is preferred to use the grooved ball-plate.

The shell may be inclosed with a cylindrical casing 25, (illustrated by dotted lines in Fig. 2,) if desired, but this is not essential.

To free or to secure a drill, it is only necessary to loosen or tighten the holding-screw. To remove the centering-block and balls in the form shown in Fig. 2, it is simply necessary to take out the screw that holds the ball-plate in the shell, and to remove the centering-block when arranged as shown in Fig. 6 it is only necessary to take out the screws which hold the ring to the end of the shell. If the drill-holding screw is completely removed, the drill-holder and spring may be taken out of the shell.

When the shank of the drill-holder is attached to the spindle of a drill-press or lathe, whether the drill is advanced to the stock or the stock is fed to the drill, the contact between the end of the stock and the inclining inner walls of the block guides the stock into the center of the recess in exact line with the axis of the drill, and further advance of either the chuck or the stock then of course either forces back the block and the shell or brings forward the drill in such manner that the perforation is accurately made. When the stock is exerting pressure against the chuck or the chuck is pressing against the stock during centering and drilling, the block that is in contact with the end of the stock remains stationary with relation to the stock, and the friction of the relative rotation between the stock and the drill is borne by the balls between the block and the ball-plate.

With this construction no part of the chuck rotates upon or against the edges of the stock, so that the centering and drilling can be performed without materially increasing the frictional load on the machine or marring the edges of the stock or wearing the walls of the centering recess.

The parts of the chuck are easily manufactured and readily assembled, and as the pressure of the moving parts is borne by the balls there is but slight wear when the chuck is in use centering and drilling stock.

I claim as my invention—

1. In a centering and drilling chuck, in combination, a drill-holding body adapted to receive a drill, a shell outside of the body, a spring thrusting between a part of the body and a part of the shell, a block with a central tapering recess rotatably mounted within the shell, and friction-reducing parts placed between the shell and the block, substantially as specified.

2. In a centering and drilling chuck, in combination, a drill-holding body adapted to receive a drill, a shell outside of the body, a spring thrusting between a part of the body and a part of the shell, a ball-plate located within the shell, a block with a central tapering recess rotatably mounted within the shell, and antifriction-balls placed between the ball-plate and the block, substantially as specified.

3. In a centering and drilling chuck, in combination, a drill-holding body adapted to receive a drill, a shell outside of the body, a spring thrusting between a part of the body and a part of the shell, a ball-plate located within the shell, a block with a central tapering recess rotatably mounted within the shell, means for retaining the block within the shell, antifriction-balls placed between the ball-plate and the block, and means for preventing the spring from separating the shell and the drill-holding body, substantially as specified.

4. In a centering and drilling chuck, in combination, a drill-holding body adapted to receive a drill, a shell outside of the body, a spring thrusting between a part of the body and a part of the shell, a ball-plate located within the shell, a block with a central tapering recess rotatably mounted within the shell, a hub projecting from the block through the ball-plate, a collar attached to the hub back of the ball-plate, and antifriction-balls placed between the ball-plate and the block, substantially as specified.

5. In a centering and drilling chuck, in combination, a drill-holding body adapted to receive a drill, a shell outside of the body, a spring thrusting between a part of the body and a part of the shell, a block with a central tapering recess rotatably mounted within the shell, antifriction-balls placed between the shell and the block, and an adjustable stop for limiting the relative movement of the drill-holding body and the shell, substantially as specified.

6. In a centering and drilling chuck, in combination, a drill-holding body adapted to receive a drill and having a shank adapted to be connected to a supporting-spindle, with a collar between the body and shank, a shell outside of the body, a spring thrusting between the collar on the drill-holder and the shell, a drill-holding screw, a ball-plate located within the shell, a block with a central tapering recess rotatably mounted within the shell, antifriction-balls placed between the ball-plate and the block, means for retaining the block in position, and adjustable devices for limiting the relative movement of the shell and drill-holding body, substantially as specified.

MORGAN JOHNSON.

Witnesses:
H. R. WILLIAMS,
E. W. FOTHERGILL.